US012259592B2

(12) United States Patent
Anderson et al.

(10) Patent No.: US 12,259,592 B2
(45) Date of Patent: Mar. 25, 2025

(54) CABLE TROUGHS FOR MANAGING FIBER OPTIC CABLES

(71) Applicant: COMMSCOPE TECHNOLOGIES LLC, Hickory, NC (US)

(72) Inventors: Scott Jean Anderson, Burnsville, MN (US); Wade P. Reitmeier, Maple Grove, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 403 days.

(21) Appl. No.: 17/628,412

(22) PCT Filed: Jul. 17, 2020

(86) PCT No.: PCT/US2020/042614
§ 371 (c)(1),
(2) Date: Jan. 19, 2022

(87) PCT Pub. No.: WO2021/016110
PCT Pub. Date: Jan. 28, 2021

(65) Prior Publication Data
US 2022/0365307 A1 Nov. 17, 2022

Related U.S. Application Data

(60) Provisional application No. 62/876,533, filed on Jul. 19, 2019.

(51) Int. Cl.
*G02B 6/00* (2006.01)
*G02B 6/44* (2006.01)

(52) U.S. Cl.
CPC ......... *G02B 6/4459* (2013.01); *G02B 6/4452* (2013.01)

(58) Field of Classification Search
CPC ............... G02B 6/4459; G02B 6/4452; G02B 6/44524; G02B 6/00
See application file for complete search history.

(56) References Cited

U.S. PATENT DOCUMENTS

| 3,858,614 A | 1/1975 | Moore et al. |
| 4,349,220 A | 9/1982 | Carroll et al. |
| (Continued) | | |

FOREIGN PATENT DOCUMENTS

| EP | 1 323 220 B1 | 7/2007 |
| WO | 2009/100206 A1 | 8/2009 |

OTHER PUBLICATIONS

International Search Report and Written Opinion of the International Searching Authority for International Patent Application No. PCT/US2020/042614 mailed Nov. 5, 2020, 9 pages.

(Continued)

*Primary Examiner* — Jennifer Doan
(74) *Attorney, Agent, or Firm* — Merchant & Gould P.C.

(57) ABSTRACT

The present disclosure relates generally to a cable management system including a trough member, at least one intermediary divider, and at least one connecting mechanism. The trough member includes a base having a plurality of holes extending through a top surface and a bottom surface, and a first sidewall and a second sidewall extending from the base. The intermediary divider includes a divider base and a divider wall extending from the base. The connecting mechanism is configured to connect the divider base of the at least one intermediary divider to the holes of the trough member.

19 Claims, 11 Drawing Sheets

(56) References Cited

U.S. PATENT DOCUMENTS

| | | | |
|---|---|---|---|
| 5,165,453 A | 11/1992 | Walker, Jr. | |
| 6,631,875 B1* | 10/2003 | Kampf | H02G 3/0608 |
| | | | 174/101 |
| 6,708,918 B2 | 3/2004 | Ferris et al. | |
| 7,029,195 B2* | 4/2006 | Nault | H02G 3/0608 |
| | | | 403/387 |
| 7,083,051 B2 | 8/2006 | Smith et al. | |
| 7,677,400 B2 | 3/2010 | Bayazit et al. | |
| 8,344,247 B2* | 1/2013 | Sayres | H02G 3/32 |
| | | | 174/72 A |
| 10,638,833 B1* | 5/2020 | Brucha | H05K 5/0217 |

OTHER PUBLICATIONS

FiberGuide® Fiber Management Systems, CommScope, 1-84 (2018).
Fiberguide® Optical Raceway Solutions: Comprehensive, long-term management for your growing fiber network, CommScope, 1-6 (2018).

* cited by examiner

CABLE TROUGHS FOR MANAGING FIBER OPTIC CABLES

CROSS-REFERENCE TO RELATED APPLICATION

This application is a National Stage Application of PCT/US2020/042614, filed on Jul. 17, 2020, which claims the benefit of U.S. Patent Application Ser. No. 62/876,533, filed on Jul. 19, 2019, the disclosures of which is are incorporated herein by reference in their entireties. To the extent appropriate, a claim of priority is made to each of the above disclosed applications.

TECHNICAL FIELD

The present disclosure relates generally to cable management structures and methods for use with telecommunication equipment racks. More particularly, this invention pertains to troughs, fittings, and couplings for a cable management system.

BACKGROUND

Cable management structures often house and organize a large number of telecommunications cables. It is desirable that telecommunications and/or power cables extending to and from the racks and the equipment mounted in the racks be managed in an organized fashion. To manage such cables, cable management structures may be mounted on the ceilings and/or floors of a data center. It is desirable to have structures organizing the cables within such racks.

One area of optical fiber management that is necessary is the routing of optical fibers from one piece of equipment to another. For example, in a telecommunications facility, optical fiber cables may be routed between fiber distribution equipment and optical line terminating equipment. In buildings and other structures, which carry such equipment, cable routing can take place in concealed ceiling areas or in any other manner to route cables from one location to another. Copper cables, hybrid cables or other transmission cables also need proper management and protection.

When routing optical fibers, it is desirable that a routing system will be easy to assemble, readily accessible, and adaptable to changes in equipment needs. Accordingly, such routing systems include a plurality of trough members such as troughs and couplings for forming the cable routing paths.

SUMMARY

One aspect of the present disclosure relates to a divider capable of being placed in a cable management trough to divide a single trough into at least two distinct trough pathways.

A first aspect relates to a cable management system comprising a trough member, at least one intermediary divider, and at least one connecting mechanism. The trough member includes a base, a first sidewall, and a second sidewall. The base includes a planar top surface, a first end, a second end, an opposing facing bottom surface, and a first side and a second side. The first end, the second end, and the first and second sides form a perimeter of the base. The base has a plurality of holes that extend through the top surface and the bottom surface. The at least one intermediary divider has a divider base, and a divider wall extending from the divider base. The connecting mechanism is configured to connect the divider base of the at least one intermediary divider to the holes of the trough member.

Another aspect relates to a method of dividing cable management trough members into at least two distinct pathways. The method includes inserting an intermediary divider into a trough member. The intermediary divider includes a divider base and a divider wall extending from the divider base. The method also includes connecting the intermediary divider to the trough member with at least one connecting mechanism. The connecting mechanism is configured to connect the divider base to at least one hole located in a base of the trough member.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Aspects of the present disclosure relate to a cable management system. An intermediary divider is provided in the cable management system to divide a trough member into at least two distinct pathways.

Generally, an intermediary divider is provided to be connected to a trough member. The intermediary divider is connected to the trough member with at least one connecting mechanism. The connecting mechanism engages at least one hole in a trough member to connect the intermediary divider to the trough member.

Figure 1:
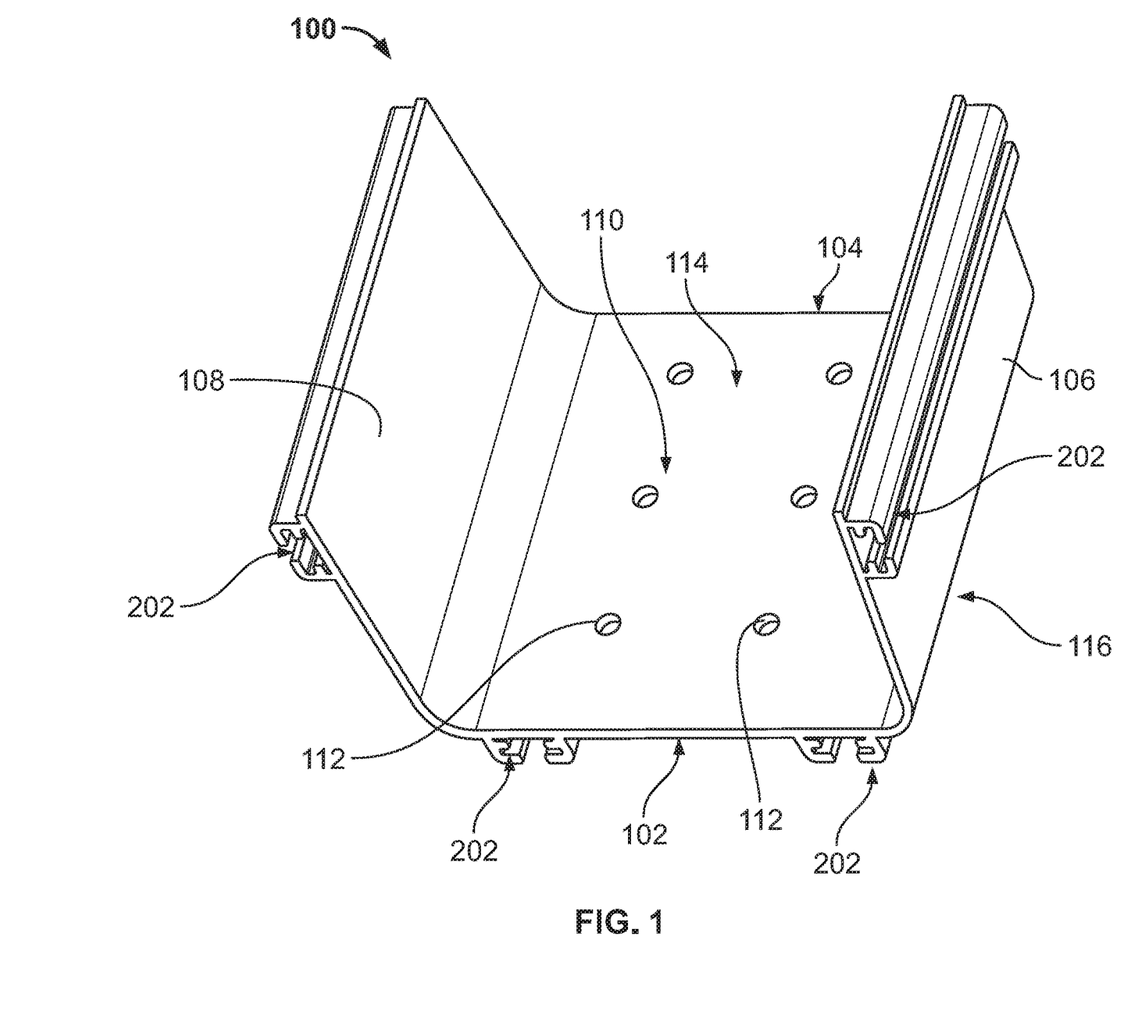
FIG. 1 illustrates an example embodiment of a trough member.

FIG. 1 illustrates a perspective view of an embodiment of a trough member 100 in accordance with the present invention. As used herein, the term trough member 100 is used to refer to any trough, fitting, railway, raceway, or similarly configured component including any number of ends.

Although a specific embodiment of a trough member 100 is shown in and described herein, any other trough member may also be used.

The trough member 100 includes a first terminal end 102 and a second terminal end 104. The trough member 100 includes a first sidewall 106 and a second sidewall 108 coupled by a base 110, thereby defining an interior surface and an exterior surface. The first sidewall 106, the second sidewall 108, and the base 110 are each generally planar.

The trough member 100 includes the base 110, which has a planar top surface and an opposing facing bottom surface. A plurality of holes 112 extend through the base 110. In an embodiment, the holes 112 have a smooth interior surface. In other embodiments, the holes 112 have a threaded interior surface.

The exterior surface defines one or more slots 202 on the sidewalls 106, 108 and base 110. The slots 202 extend in a longitudinal direction of the trough member 100 from the first terminal end 102 to the second terminal end 104. Typically, slots 202 will be provided for at least one, and preferably each, locking element, which allows multiple troughs to be connected to form a longitudinal trough member 100.

Figure 2:
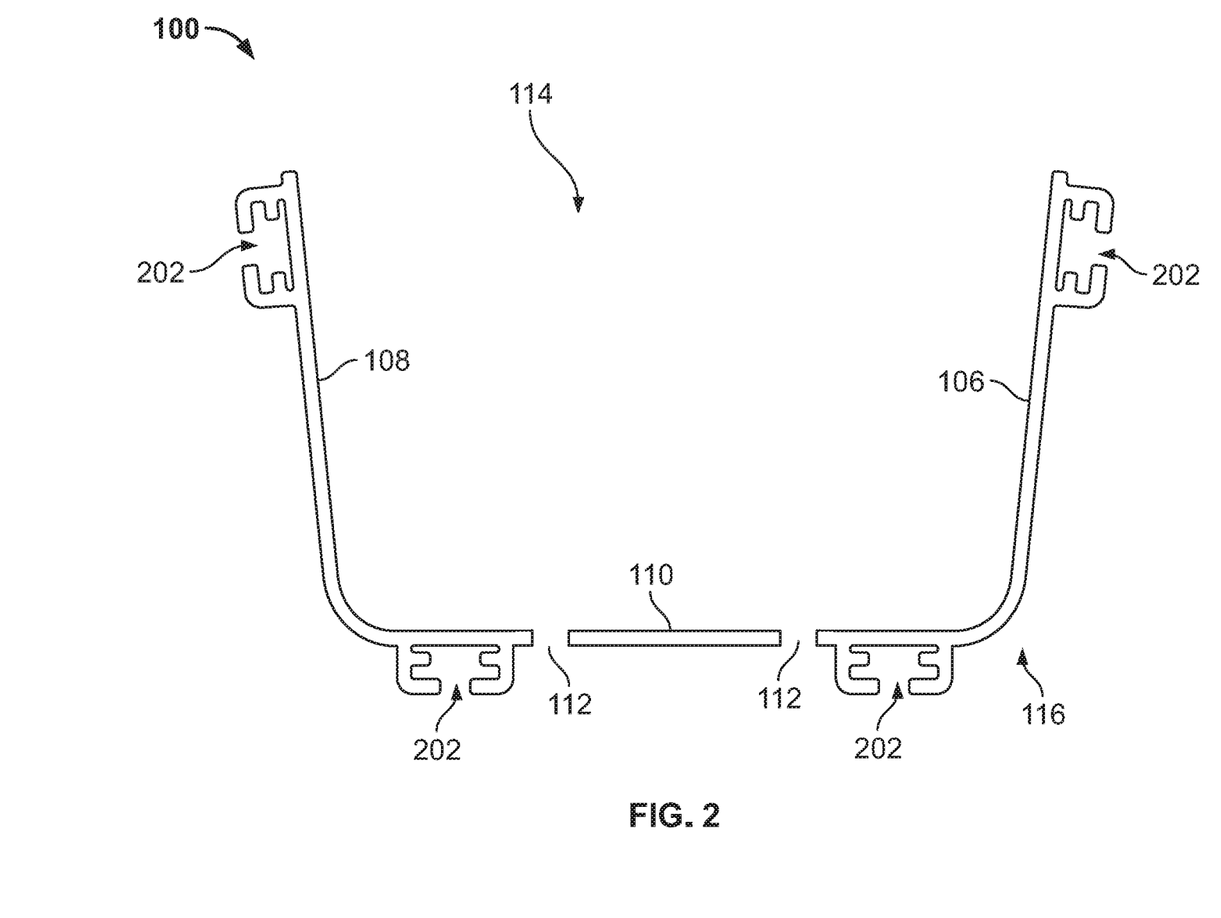
FIG. 2 illustrates a cross-sectional view of a trough member.

FIG. 2 illustrates a cross-sectional view of a trough member 100. The trough member 100 preferably has a continuous cross-section, and can be cut to a desired length. The longitudinal trough member 100 is preferably made by an extrusion process.

The trough member 100 includes the base 110 and the first sidewall 106 and second sidewall 108 that extend from the base 110. The base 110, the first sidewall 106, and the second sidewall 108 define an interior surface that holds a plurality of optical fibers. In an embodiment, the first sidewall 106 and the second sidewall 108 have a predetermined height.

The exterior surface defines one or more slots 202 on the first sidewall 106, second sidewall 108, and base 110. The slots 202 extend in a longitudinal direction of the trough member 100 from the first terminal end 102 to the second terminal end 104.

The trough member 100 also includes a plurality of holes 112 that extend through the base 110. In the embodiment shown, the base 110 includes two rows of holes 112, but more or less rows are contemplated. In a first embodiment, the holes 112 of each row are aligned. In an alternative embodiment, the holes 112 of each row are staggered.

Figure 3:
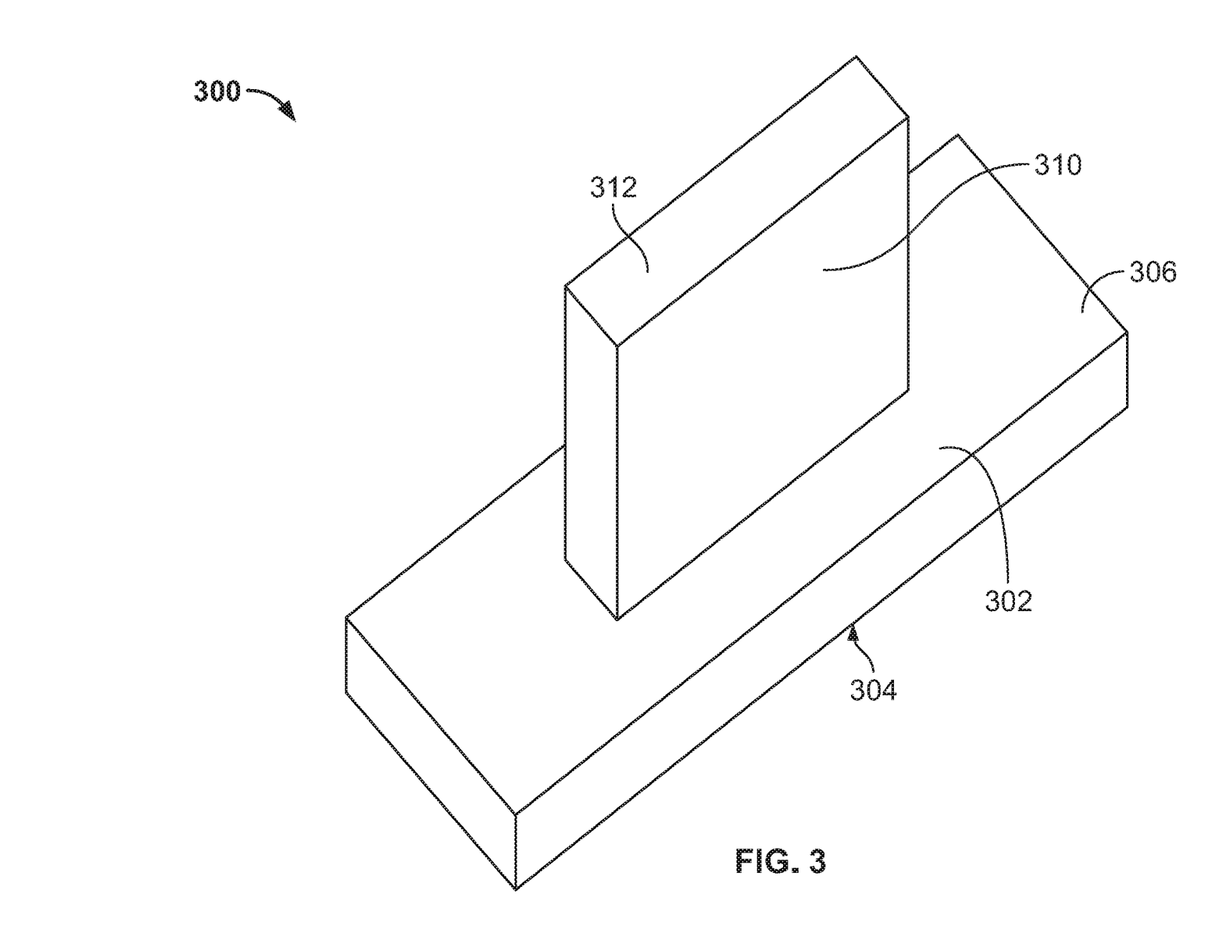
FIG. 3 illustrates an example intermediary divider.

FIG. 3 illustrates an example intermediary divider 300. The intermediary divider 300 includes a divider base 302 and a divider wall 310 extending from the divider base 302. The divider base 302 includes a planar top surface 306 and an opposing facing bottom surface 304. In an example, the divider base 302 is generally rectangular in shape; however, other shapes are contemplated. For example, the divider base 302 may have a triangle shape, an L-shape, an H-shape, or other similar shapes.

The divider wall 310 of the intermediary divider 300 extends upward from the divider base 302. In an embodiment, the divider wall 310 is straight. The divider wall 310 may be located along a midline of the divider base 302; however, in other embodiments the divider wall 310 may be located off the midline of the longitudinal length of the divider base 302.

In an embodiment, the divider wall 310 has a height that is equal to or less than the height of the first sidewall 106 and the second sidewall 108 of the trough member 100. The divider wall 310 also includes a top surface 312. The top surface 312 has a rounded surface, so as not to cause damage to the optical fibers. In an embodiment as shown in FIG. 3, the divider wall 310 does not include a lip on the top surface 312. In another embodiment, the top surface 312 includes a lip on the top surface 312 (not shown).

Although only a single divider wall 310 is shown on the intermediary divider 300, multiple divider walls 310 may extend up from the divider base 302 in other embodiments. For example, a plurality of divider walls 310 may extend from the divider base 302 in a generally parallel configuration. However, a plurality of divider walls 310 may extend at other angles relative to each other.

Figure 4:
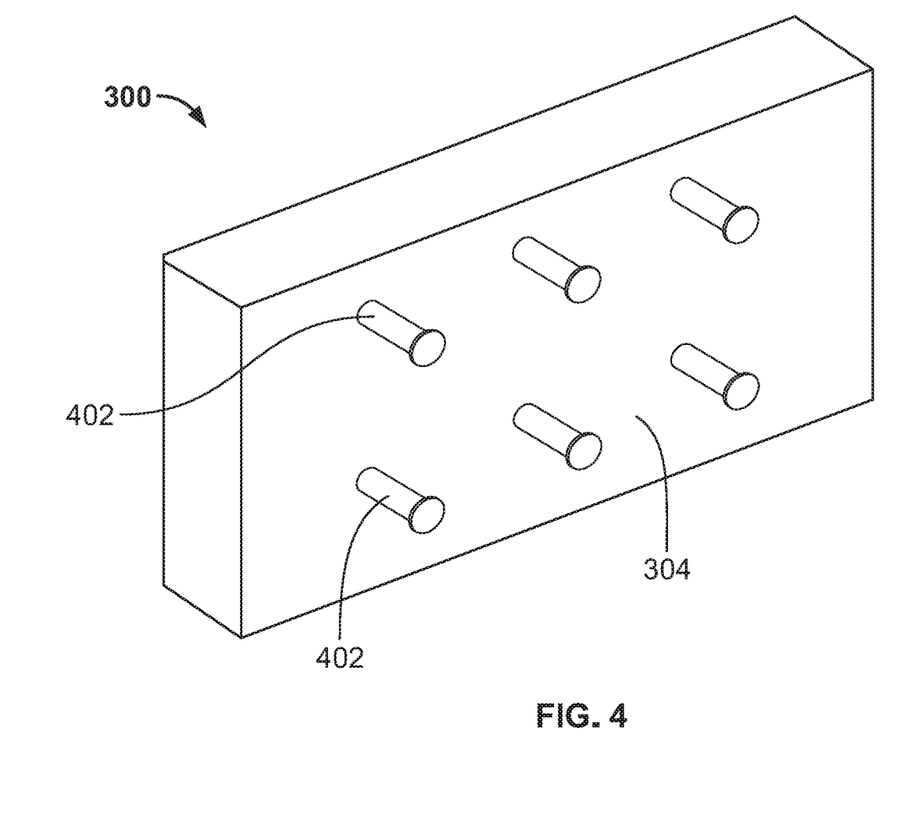
FIG. 4 illustrates a view of the base of the intermediary divider of FIG. 3.

FIG. 4 illustrates the bottom surface 304 of the intermediary divider 300. The bottom surface 304 includes a plurality of connecting mechanisms 402. In an example, the connecting mechanisms 402 extend out from the divider base 302. The connecting mechanisms 402 have a diameter that is slightly smaller than the diameter of the holes in the trough member.

In an example, the connecting mechanisms 402 may be a swell latch or have a friction fit connection. The connecting mechanisms 402 may be a removable connection that allows the intermediary divider 300 to be moved in the trough member 100 as needed. In another embodiment, the connecting mechanisms 402 are not removable, and the intermediary divider 300 is not moveable once placed in the trough member.

In another embodiment, the connecting mechanisms 402 are separate from the intermediary divider 300. Separate connecting mechanisms 402 are described in more detail at FIGS. 7A-7D.

In an embodiment where the connecting mechanisms 402 are not fixedly connected to the intermediary divider 300, a plurality of holes (not shown) extend through the divider base 302. The plurality of holes match the pattern of the plurality of holes in the trough member. The plurality of holes extend through the entire divider base 302.

Figure 5:
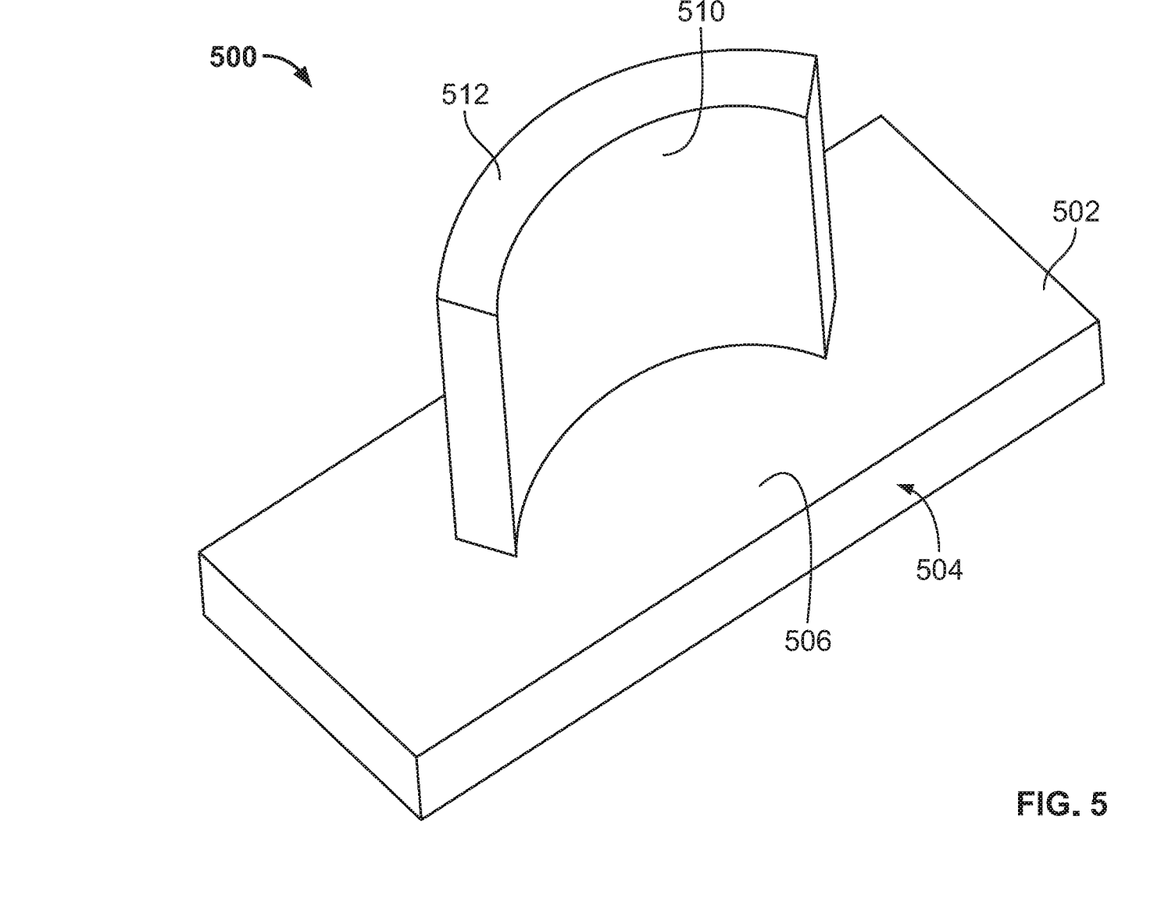
FIG. 5 illustrates another example intermediary divider.

FIG. 5 illustrates another embodiment of an intermediary divider 500. The intermediary divider 500 includes a base 502 and a wall 510 extending up from the base 502. The base 502 includes a planar top surface 506 in an opposing facing bottom surface 504. In an example, the base 502 is rectangular in shape, however other shapes, as described above, are contemplated The wall 510 of the intermediary divider 500 extends upward from the base 502. The wall 510 has a generally curved shape. Although only a single wall 510 is shown in the intermediary divider 500, multiple walls 510 may extend up from the base 502 in other embodiments.

In an embodiment, the intermediary divider 500 includes connecting mechanisms 402 extending from the bottom surface 504, similar to the base shown in FIG. 4. In another embodiment, a plurality of holes (not shown) extend through the base 502.

Figure 6:
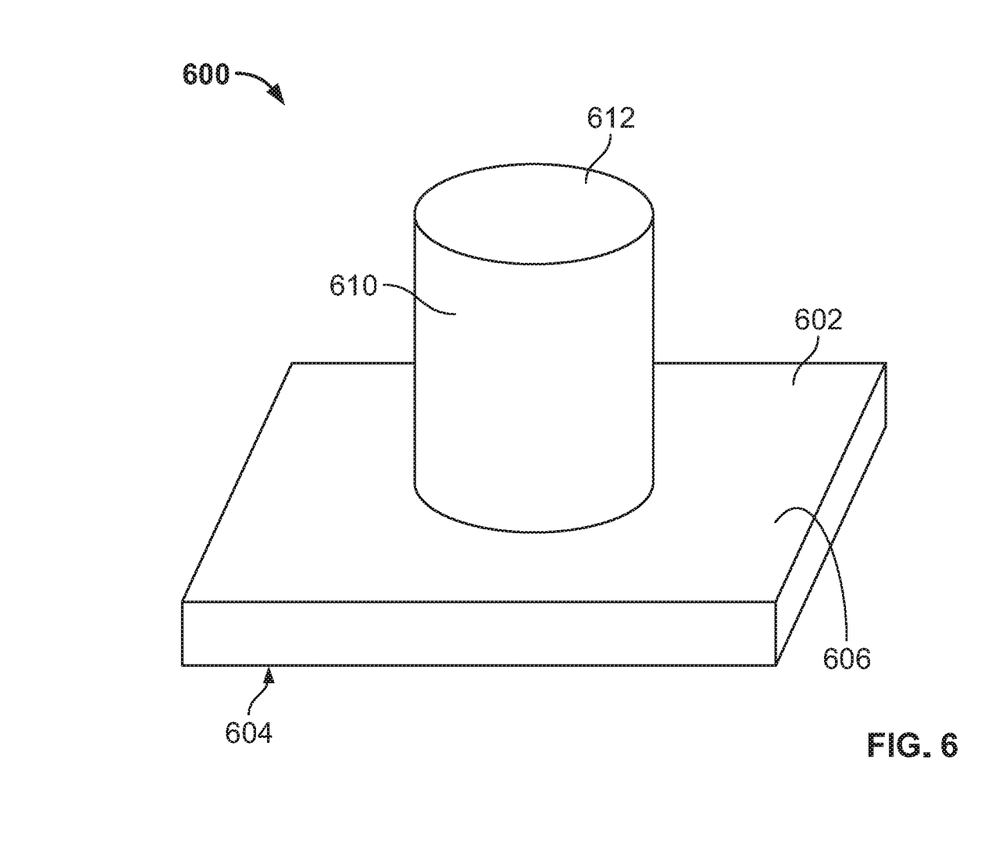
FIG. 6 illustrates another example intermediary divider.

FIG. 6 illustrates another example embodiment of an intermediary divider 600. The intermediary divider 600 includes a base 602 and a cylindrical wall 610 extending up from the base 602. The base 602 includes a planar top surface 606 and an opposing facing bottom surface 604. In an example, the base 602 is rectangular in shape, however other shapes are contemplated, for example the base 602 could be oval, or have rounded sides.

In an example embodiment, the wall 610 is a cylinder, or a cylinder-like shape. As shown, in a first embodiment, the cylinder does not include a lip located on an end opposite the base 602. In another embodiment, the cylinder includes a lip on an end opposite the base 602.

FIGS. 7a-7d illustrate example connecting mechanisms 700 that are not connected to the intermediary divider 300, 500, 600. As described above, the connecting mechanisms 700 may be removable. The shaft 706 and the second end 704 of the connecting mechanism 700 may be the same as described below if the connecting mechanism 700 is connected to the intermediary divider 300, 500, 600 on a first end 702.

Figure 7A:
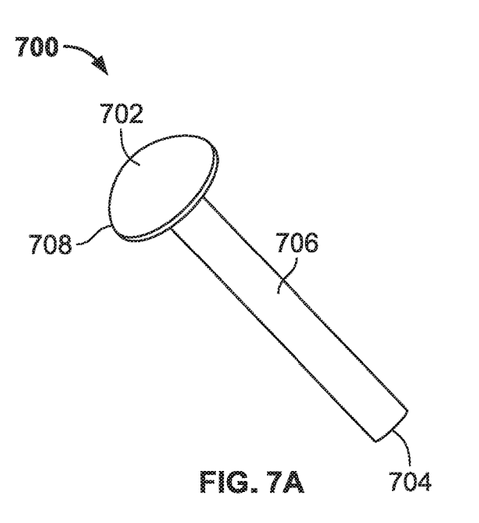
FIGS. 7*a*-7*d* illustrate example connecting mechanisms.

FIG. 7a illustrates example connecting mechanism 700 having a first end 702 and a second end 704 connected by a shaft 706. The first end 702 includes a lip 708. The lip 708 has a diameter that is greater than the diameter of the shaft 706. The lip 708 has a diameter that is greater than the diameter of the holes, so as to act as a positive stop for the connecting mechanism 700. In the example shown, the shaft 706 has a constant diameter from the first end 702 to the second end 704.

The lip 708 of the removable connecting mechanism 700 may have a generally flat surface, alternatively, the lip 708 may have a rounded surface. The lip 708 of the removable connecting mechanism 700 is moved such that it will not damage optical fibers as an optical fiber is moved across the top of the lip 708.

Figure 7B:
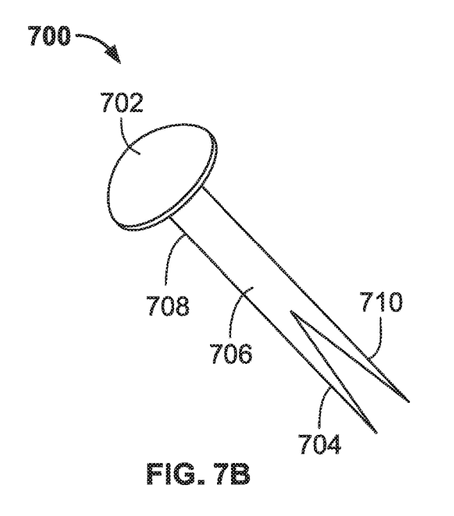

FIG. 7b illustrates another connecting mechanism 700 having a first end 702 and a second end 704 connected by a shaft 706. The first end 702 includes a lip 708. The lip 708 has a diameter that is greater than the diameter of the shaft 706. The second end 704 includes a split 710. The split 710 compresses together upon insertion into the holes of the trough member. The split 710 then expands after insertion to maintain the connecting mechanism 700 connected to the trough member 100. The fit of the connecting mechanism 700 may be an interference fit.

Figure 7C:
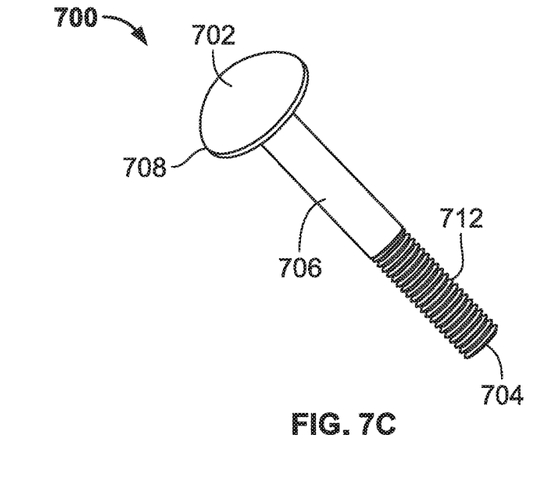

FIG. 7c illustrates a connecting mechanism 700 having a threaded 712 shaft 706. In the embodiment shown, the threads 712 do not extend along the entire length of the shaft 706. In another embodiment, the threads 712 extend along a portion of the length of the shaft 706. The threads 712 mate with threads located in the holes of the intermediary divider 300, 500, 600 and/or the holes 112 of the trough member 100.

Figure 7D:
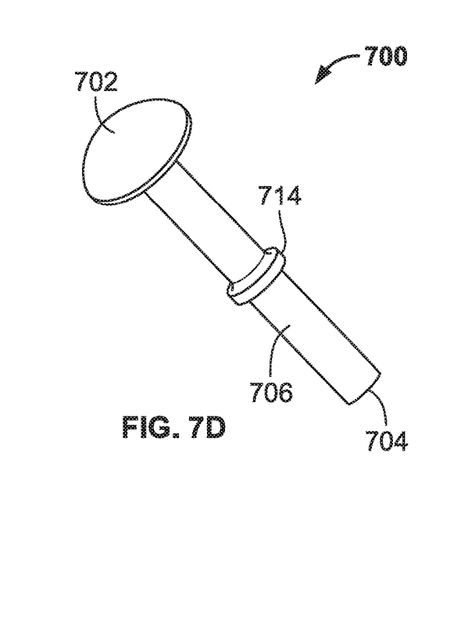

FIG. 7d illustrates a connecting mechanism 700 having a protrusion 714 located along the shaft 706. The protrusion 714 is located at a length, when measured from the first end 702 that allows the protrusion 714 to extend through the base of the trough member. The protrusion 714 may extend around the entire shaft 706. Alternatively, the protrusion 714 may extend only partially around the shaft 706.

Figure 8:
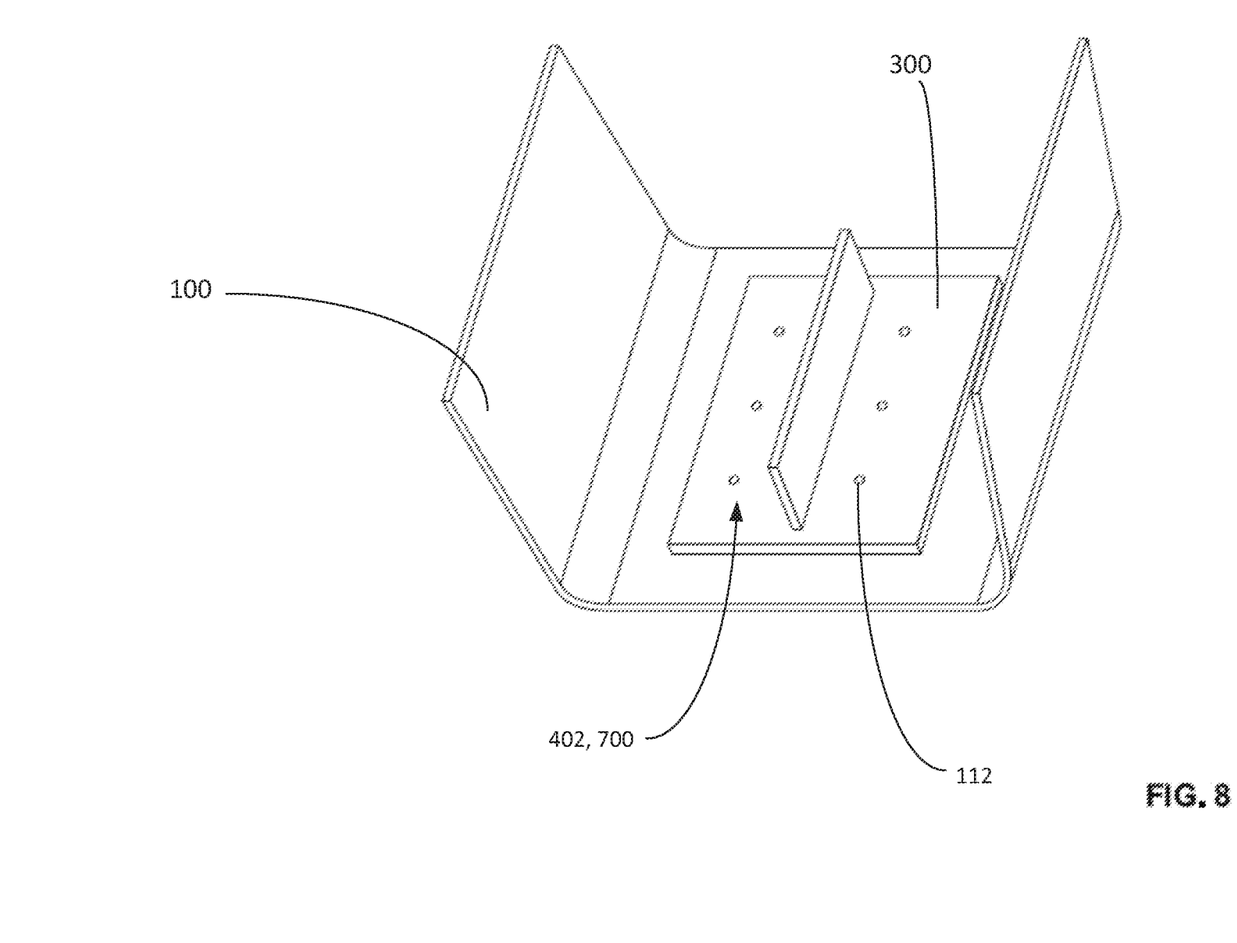
FIG. 8 illustrates an example intermediary member connected to a trough member.

FIG. 8 illustrates an example embodiment of an intermediary divider 300 connected to a trough member 100 with at least one connecting mechanism 402, 700. A connecting mechanism 402, 700 is placed through the plurality of holes 112 at least in the trough member 100 and maintains the intermediary divider 300 in place. The intermediary divider 300 creates at least two pathways in the trough member 100.

Figure 9:
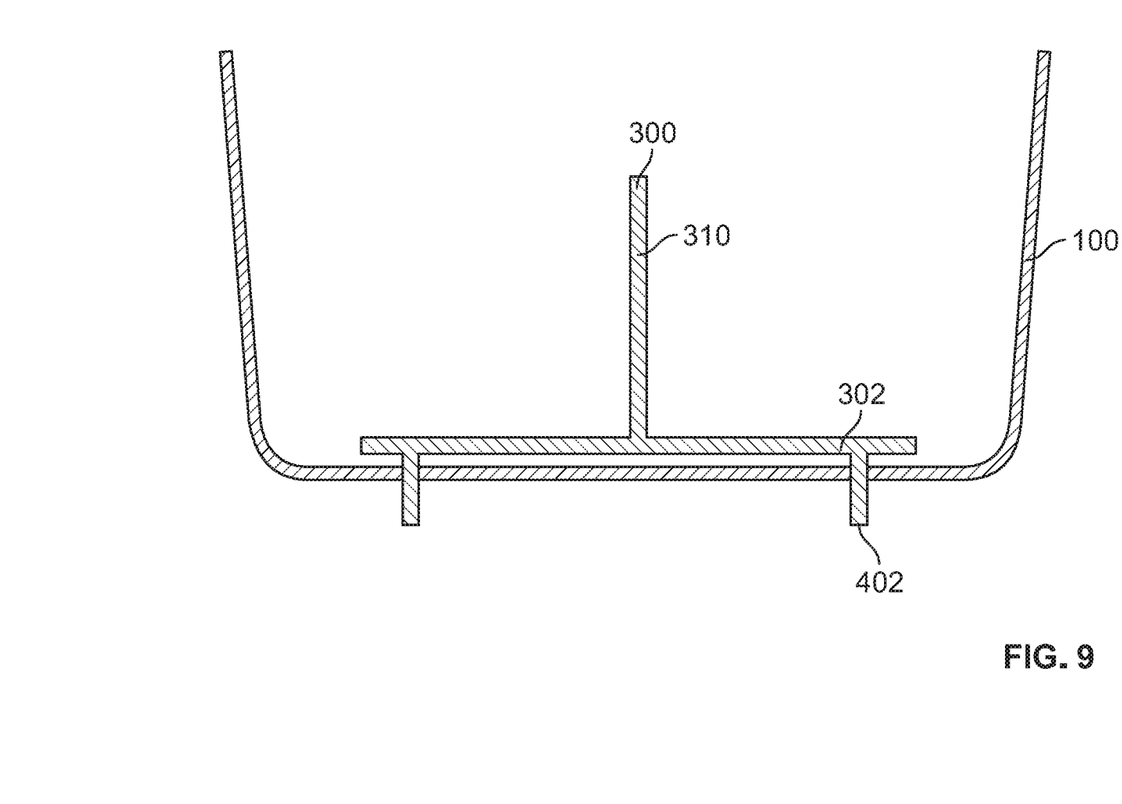
FIG. 9 Illustrates a cross-sectional view of an intermediary member connected to a trough member.

FIG. 9 illustrates a cross-sectional view of a trough member 100 with a connected intermediary divider 300. As shown, the connecting mechanism 402 extends from the bottom of the intermediary divider 300, through the holes 112 of the tough member 100. The intermediary divider 300 creates at least two pathways in the trough member 100.

FIGS. 10a-10d illustrates example embodiments of intermediary dividers 1000 having different divider wall 1002 configurations and different cutout 1006 configurations for connecting mechanisms. In the embodiments shown, the cutouts 1006 are provided for a separate connecting mechanism to extend though and to connect the intermediary divider 1000 to the tough member 100.

Figure 10A:
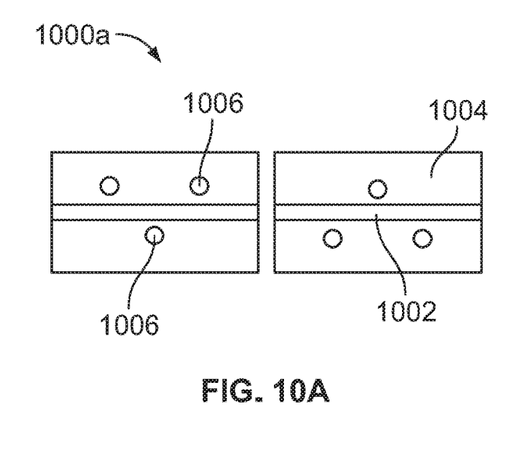
FIGS. 10*a*-10*d* illustrate example embodiments of intermediary dividers.

FIG. 10a illustrates an intermediary divider 1000a having a rectangular base shape with a divider wall 1002 extending from a longitudinal middle of the divider base 1004. A plurality of cutouts 1006 extend through the base 1004 in two rows on opposing sides of the divider wall 1002 in an offset configuration.

Figure 10B:
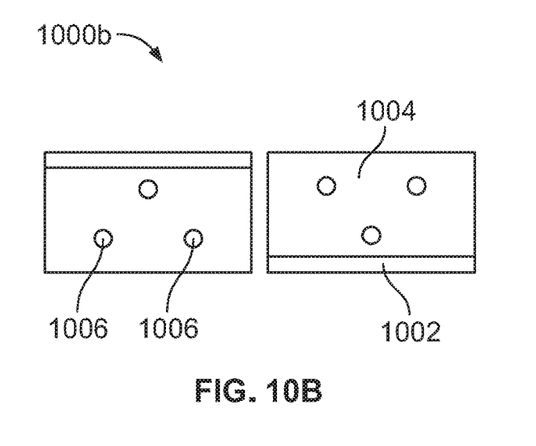

FIG. 10b illustrates an intermediary divider 1000b having a rectangular base shape with a divider wall 1002 extending from an edge of the divider base 1004. A plurality of cutouts 1006 extend through the base 1004 in two rows in an offset configuration.

Figure 10C:
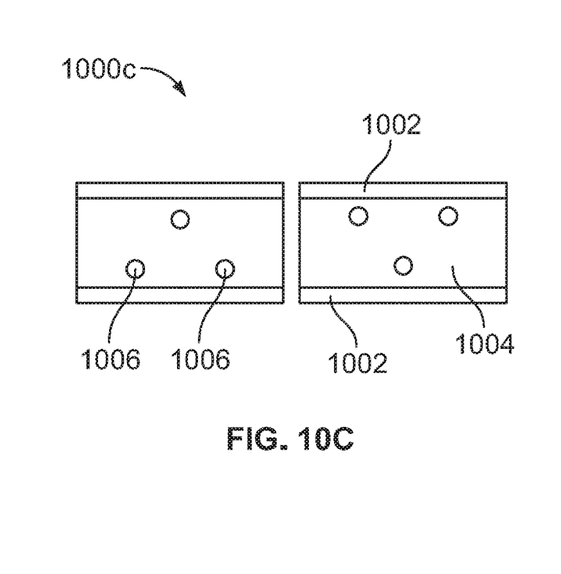

FIG. 10c illustrates an intermediary divider 1000c having a rectangular base shape with two divider walls 1002 extending on both longitudinal edges of the divider base 1004. A plurality of cutouts 1006 extend through the base 1004 in two rows in an offset configuration.

Figure 10D:
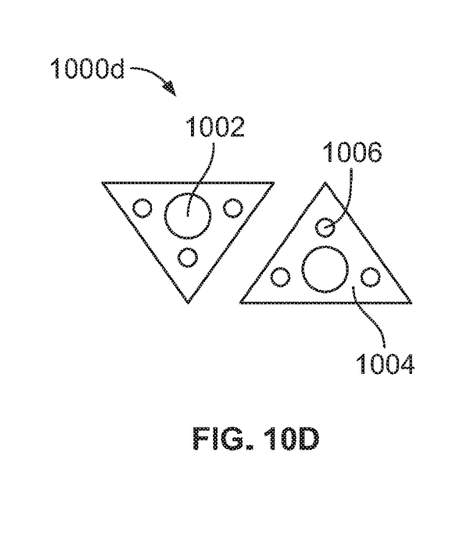

FIG. 10d illustrates an intermediary divider 1000d having a triangular base shaped with a divider wall 1002 extending from a middle of the divider base 1004. The divider wall 1002 is shaped as a spool, but in alternative embodiments may be shaped as a traditional wall. A plurality of cutouts 1006 extend through the base 1004 in two rows on opposing sides of the divider wall 1002 in an offset configuration.

Figure 11:
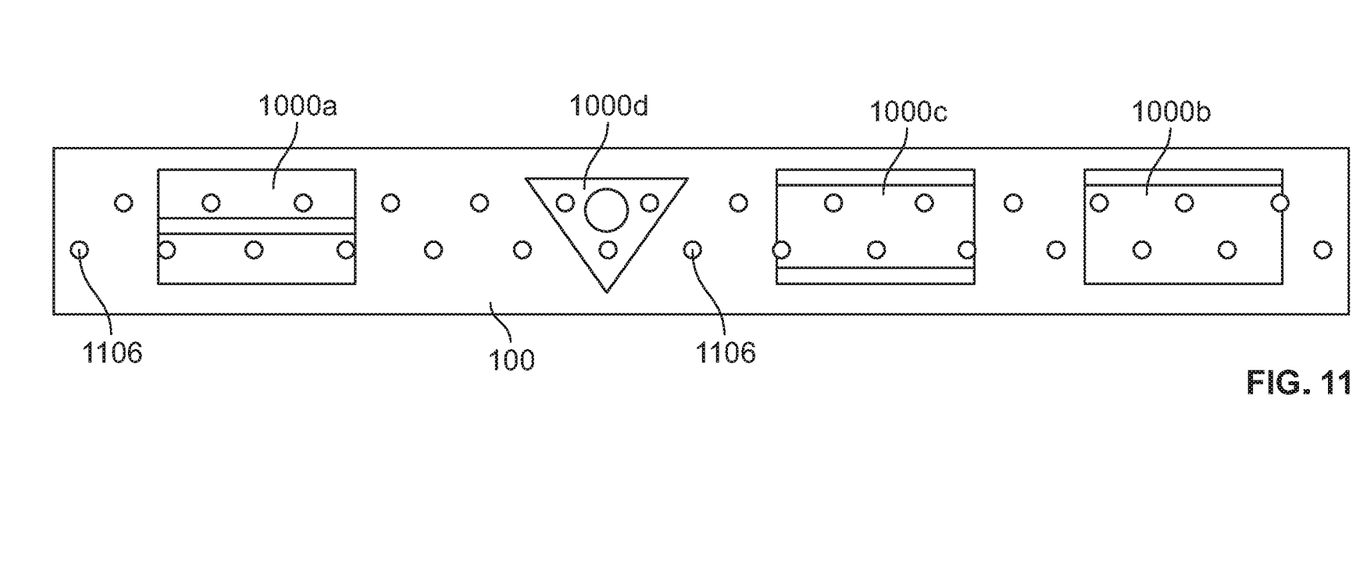
FIG. 11 illustrates an example embodiment of intermediary dividers of FIGS. 10*a*-10*d* in a trough member.

FIG. 11 illustrates an example embodiment of a plurality of intermediary dividers 1000 connected to a trough member 100. The trough member 100 includes a plurality of cutouts 1106 that extend along the longitudinal axis in two rows in an offset configuration. The configuration of the cutouts 1106 on the trough member 100 matches the offset configuration of the cutouts 1006 on the intermediary dividers 1000. As shown, each of the intermediary dividers 1000a, 1000b, 1000c, 1000d are capable of connecting to the trough member 100.

The intermediary dividers divide a trough into at least two pathways to allow for separation of different cables. Different fiber cables can be separated. Fiber cables can be separated from copper cables. Other separation of cables are possible.

Cables can cross over from one pathway to another if the dividers are spaced from each other, if needed.

Embodiments of the present invention, for example, are described above with reference to block diagrams and/or operational illustrations of methods and systems according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

The invention claimed is:

1. A cable management system comprising:
   a trough member including:
   a base including a planar top surface, a first end, and a second end, an opposing facing bottom surface, and a first side and a second side, the first end, the second end, and the first side and the second side forming a perimeter of the base, the base having a plurality of holes extending through the top surface and the bottom surface;
   a first sidewall and a second sidewall extending from the base, wherein the first sidewall, the second sidewall, and the base define a trough shape;
   at least one intermediary divider, the at least one intermediary divider having a divider base with a lower surface and a divider wall extending upwardly from the divider base; and
   at least one connecting mechanism, the connecting mechanism configured to connect the divider base of the at least one intermediary divider to the holes of the trough member;
   wherein the lower surface of the divider base of the at least one intermediary divider faces the planar top surface of the base of the trough member.

2. The cable management system of claim 1, wherein the connecting mechanism is removable.

3. The cable management system of claim 1, wherein the divider base includes a plurality of holes extending through the divider base.

4. The cable management system of claim 1, wherein the connecting mechanism has a first end secured to the divider wall and a free second end.

5. The cable management system of claim 1, wherein the intermediary divider has a longitudinal axis and the divider wall extends along the longitudinal axis.

6. The cable management system of claim 1, wherein the intermediary divider has a longitudinal axis and the divider wall extends at an angle relative to the longitudinal axis.

7. The cable management system of claim 6, wherein the angle is from 30° to 60° relative to the longitudinal axis.

8. The cable management system of claim 1, wherein the divider wall is cylindrical.

9. The cable management system of claim 1, wherein the divider wall has a height that is less than a height of the first sidewall and the second sidewall.

10. The cable management system of claim 1, wherein the connecting mechanism is a swell latch.

11. The cable management system of claim 1, wherein the connecting mechanism is a friction fit.

12. The cable management system of claim 1, wherein the connecting mechanism has a flat head on a first end.

13. The cable management system of claim 1, wherein the divider wall is straight.

14. The cable management system of claim 1, wherein the divider wall is curved.

15. The cable management system of claim 1, wherein the base of the trough member defines a longitudinal axis, and the plurality of holes comprises four rows of holes along the longitudinal axis.

16. The cable management system of claim 15, wherein the holes are spaced about 6 inches apart along each row.

17. The cable management system of claim 15, wherein the rows of the plurality of holes are aligned.

18. The cable management system of claim 15, wherein the rows of the plurality of holes are staggered.

19. The cable management system of claim 1, wherein the intermediary divider has a portion of the divider base on each side of the divider wall.

* * * * *